US005358582A

United States Patent [19]

Koshizuka et al.

[11] Patent Number: 5,358,582

[45] Date of Patent: Oct. 25, 1994

[54] ID CARD AND METHOD OF ITS PRODUCTION

[75] Inventors: Kunihiro Koshizuka; Shigehiro Kitamura; Atsushi Nakajima; Tomonori Kawamura, all of, Hino, Japan

[73] Assignee: Konica Corporation, Japan

[21] Appl. No.: 871,963

[22] Filed: Apr. 21, 1992

[30] Foreign Application Priority Data

Apr. 26, 1991 [JP] Japan .................................... 3-97349

[51] Int. Cl.[5] .......................... B44C 1/16; B32B 7/00; B42D 15/00

[52] U.S. Cl. .................................... 156/235; 156/249; 156/277; 283/77

[58] Field of Search ............... 156/277, 234, 235, 249; 283/77

[56] References Cited

U.S. PATENT DOCUMENTS

| | | | |
|---|---|---|---|
| 3,204,354 | 9/1965 | Berger | 283/77 X |
| 3,417,497 | 12/1968 | Hannon | 283/77 X |
| 3,566,521 | 9/1967 | Conner | 283/77 X |
| 3,949,501 | 4/1976 | Andrews | 156/233 X |
| 4,066,050 | 2/1977 | Hurst | 156/277 X |
| 4,097,279 | 6/1978 | Whitehead | 156/277 X |
| 4,370,397 | 1/1983 | Ceintrey | 430/10 X |
| 4,773,677 | 9/1988 | Plasse | 283/77 X |
| 4,928,996 | 5/1990 | Oshikoshi | 283/77 X |
| 4,992,353 | 2/1991 | Rodakis | 430/213 X |
| 5,011,570 | 4/1991 | Ohbayashi | 156/310 |

FOREIGN PATENT DOCUMENTS

| | | | |
|---|---|---|---|
| 0431564 | 6/1991 | European Pat. Off. | 283/77 |
| 0244895 | 9/1989 | Japan | 283/77 |
| 1193850 | 9/1989 | Japan | 283/77 |
| 1205155 | 9/1989 | Japan | 283/77 |
| 9117056 | 11/1991 | PCT Int'l Appl. | 283/77 |
| 2250951 | 6/1992 | United Kingdom | 283/77 |

*Primary Examiner*—David A. Simmons
*Assistant Examiner*—Charles Rainwater
*Attorney, Agent, or Firm*—Jordan B. Bierman

[57] ABSTRACT

The object of the present invention is to provide a method of simply producing an ID card which can provide the Id card with character information shared by the same kind of ID cards issued in large numbers, and an ID card which offers improved protection of the gradation image formed on the image-receiving layer and which is difficult to forge or alter.

The ID card is characterized in that a transparent resin sheet having character information shared by the same kind of ID cards is provided on the surface of an image-receiving layer which has a gradation image and character-information-bearing image and which has been formed on the support. The method of producing an ID card of the present invention is characterized in that a transparent resin sheet having character information shared by the same kind of ID cards is provided by hot stamping in the gradation image forming region of the image-receiving layer which has a gradation image and character-information-bearing image and which has been formed on the support.

16 Claims, 1 Drawing Sheet

ID CARD AND METHOD OF ITS PRODUCTION

FIELD OF THE INVENTION

The present invention relates to an ID card and a method of its production, more specifically an ID card of the same kind issued in large numbers and a method of its rapid production.

BACKGROUND OF THE INVENTION

Traditionally, a wide variety of ID cards, including personal identification certificates, driving licenses and membership certificates, have been used. The ID card usually bears a personal figure image four identifying the card owner and various records. The personal figure image can be prepared as a gradation information image because it usually has a density gradation. The various records include the address, name, date of birth and position of the card owner and the validation date of the card in the case of personal identification certificates, and the date of birth, name and license number of the card owner and the license category in the case of driving licenses. These records can be prepared as character information because they are usually written in characters, numerical figures, symbols, etc.

In recent years, ID cards prepared to have a gradation image formed by sublimation thermal transfer have been developed, since beautiful images can easily be formed. Sublimation thermal transfer is generally defined as the method by which a gradation image, such as a portrait image, is formed in the image-receiving layer by superposing the image-receiving layer of an image-receiving sheet formed on a support and the ink layer, containing a sublimation dye, of an ink sheet on a support and subjecting them to imagewise heating to diffuse and transfer the sublimation dye into the image-receiving layer.

The ID card also bears non-personal information shared by the same kind of ID cards issued in large numbers in characters, figures, symbols, etc. For example, in driving licenses, a kind of ID card, the gradation image as a portrait picture and the date of birth, name, etc. of the card owner are unique to the card owner, while the name of the public safety commission which has issued the driving license, ruled lines, frames, etc. are all common among all driving licenses of the same kind.

It is therefore very inefficient to form a gradation image as a portrait image, personal information of the card owner and information common to the licenses issued by the driving license issuer on the surface of the image-receiving layer formed on the support for each sheet of driving license. Since driving license issuers should quickly issue a large number of driving licenses at one time, there is demand for a method of quickly producing driving licenses.

ID cards, such as driving licenses, cannot serve for their essential purpose, if they permit easy forgery or alteration, such as exchanging the portrait picture and rewriting the recorded information.

In addition, it is essential to protect the card's face on which the portrait picture and information have been recorded by some means to provide the recorded image with durability under various sets of conditions.

However, the conventional laminate film type surface protecting method, which uses a thermoplastic resin as an adhesive, is faulty that heating adhesion is weak and curling is likely to occur upon hot pressing.

The present invention has been developed in the circumstances described above.

Accordingly, it is an object of the invention to provide an ID card which can be produces rapidly. It is another object of the invention to provide a method of rapidly producing an ID card.

SUMMARY OF THE INVENTION

Developed with the aim of solving the problems described above, the present invention provides an ID card wherein a transparent resin layer having character information shared by a given group of ID cards is formed by hot stamping on the image-forming face of an ID card substrate comprising a support and an image-receiving layer formed thereon, which image-receiving layer has a gradation image formed with a heat diffusible dye and a character-information-bearing image formed with a heat diffusible dye or hot melt ink, or a method of producing an ID card wherein a gradation image is formed with a heat diffusible dye on the image-receiving layer of the support, a character-information-bearing image is formed with a heat diffusible dye or hot melt ink in the image-receiving layer region where the gradation image is not formed, and then a transparent resin sheet printed with character information shared by the same kind of ID cards issued in large nun%bets is adhered to the surface of the image-receiving layer by hot stamping.

In the ID card of the present invention, the transparent resin layer has been formed by hot melt adhering a transparent resin sheet printed with information shared by the same kind of ID cards issued in large numbers on the surface of an image-receiving layer having a gradation image and a character-information-bearing image by hot stamping. The ID card of the present invention can therefore be produced rapidly. In addition, this ID card offers protection of the image formed on the image-receiving layer because the transparent resin layer has been hot melt adhered onto the image-receiving layer on the image-forming surface.

According to the method of producing an ID card of the present invention, the desired card can be obtained solely by adhering by hot stamping a transparent resin sheet printed with character information shared by a given group of ID cards on the face of the image-receiving layer of the support, having a gradation image formed with a heat diffusible dye and a character-information-bearing image formed with a heat diffusible dye or hot melt ink; therefore, the ID card can be rapidly produced, and multiple color information can easily be provided by printing the shared information in various colors.

DETAILED DESCRIPTION OF THE INVENTION

Figure 1:
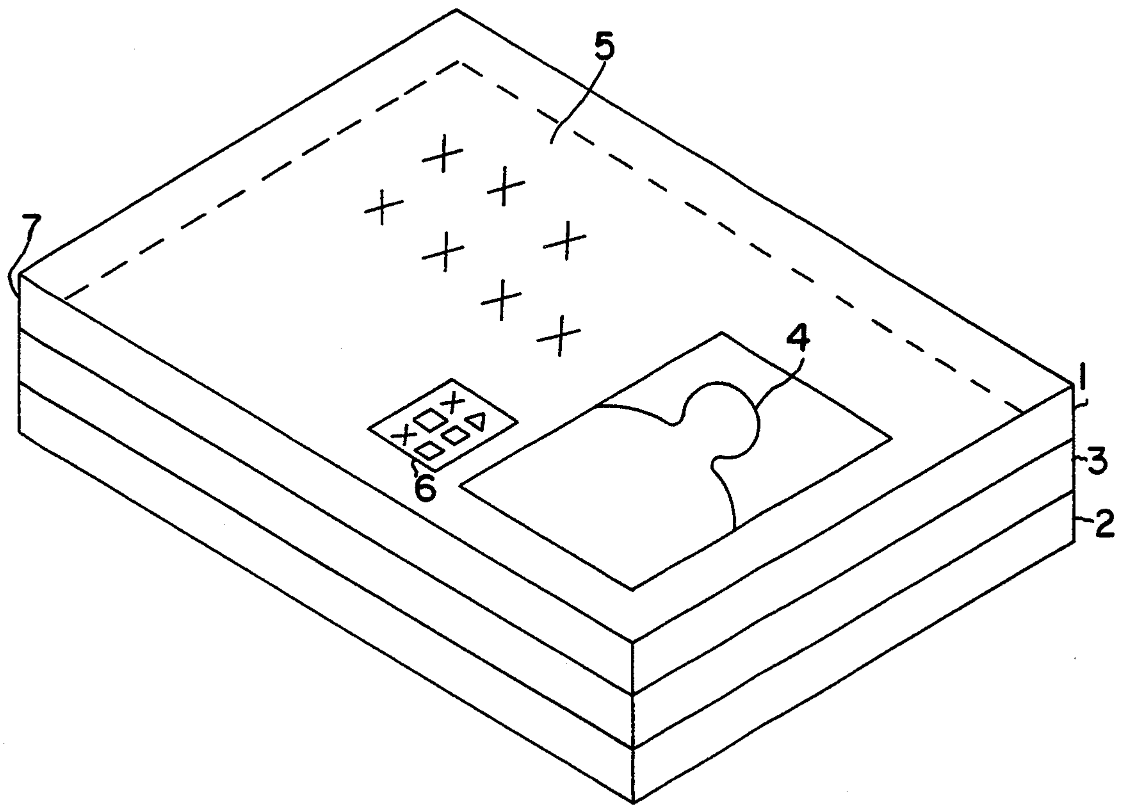
FIG. 1 shows a mode of embodiment of the ID card according to the present invention, wherein the numerical symbols respectively denote an ID card, (1), a support (2), an image-receiving layer (3), a portrait image (4), a character-information-bearing image (5), a character image printed by hot stamping (6) and a transparent film (7).

A mode of the present invention is hereinafter described in detail with reference to the drawing.

FIG. 1 is a schematic view of a mode of the ID card of the present invention.

In FIG. 1, the ID card 1 comprises the support 2, the image-receiving layer 3 which has been formed on the support 2 and has the gradation image 4 formed by sublimation thermal transfer and the character-information-bearing image 5 formed by hot melt transfer or sublimation thermal transfer; and the transparent resin layer 7 which has been formed on the surface of the image-receiving layer having character-information-bearing image and gradation image by hot stamping and has the character image 6 formed on the surface facing the image-receiving layer. The support 2 may be provided with a writing layer (not illustrated in FIG. 1) on the surface opposite to the face having the image receiving layer 3 formed thereon.

1. Image-Receiving Sheet for Thermal Transfer Recording Support

Examples of materials for the support include various papers such as ordinary paper, coat paper and synthetic paper (polypropylene, polystyrene or composite thereof with paper), various plastic films or sheets such as white vinyl chloride resin sheets, white polyethylene terephthalate base films, transparent polyethylene terephthalate base films and polyethylene naphthalate base films, films or sheets of various metals, and films or sheets of various ceramics. Among these the most preferable material for the support is polyethylene terephthalate base film.

It is preferable to add a white pigment such as titanium white, magnesium carbonate, zinc oxide, barium sulfate, silica, talc, clay or calcium carbonate to the support to improve the distinctness of the image formed in the process which follows.

When it is desired to obtain an ID card such as that for driving license, it is preferable to configure the support with a sheet or film comprising a composition of the white pigment described above and the vinyl chloride resin described below.

The thickness of the support is normally 200 to 1,000 μm, preferably 300 to 800 μm. The support may be provided with embossing, signs, IC memories, photomemories, magnetic recording layers and other prints and devices as necessary.

Image-Receiving Layer

The image-receiving layer on the surface of the support may be formed with a binder and various additives, or with a binder alone. Furthermore, a double layer including an upper layer as an anti-sticking layer in order to prevent the ink-ribbon from sticking, can be formed.

1. Binder

The binder for the image-receiving layer for the present invention may be any one selected from known common binders for image-receiving layer for sublimation thermal transfer recording. Examples of such binders include vinyl chloride resins, polyvinyl acetal, buthylal or aceto-acetal, polyester resins, polycarbonate resins, acrylic resins and various heat-stable resins. Although any binder can be selected out of the above-mentioned binders, it is preferable to use vinyl chloride resin from the viewpoint of image preservability end other aspects. Examples of the vinyl chloride resin include polyvinyl chloride resin and vinyl chloride copolymers.

Examples of such vinyl chloride copolymer include copolymers of vinyl chloride and another comonomer containing not less than 50 mol % of vinyl chloride as monomer unit.

Examples of the other comonomer include vinyl esters of fatty acid such as vinyl acetate, vinyl propionate, vinyl palmitate and vinyl ester of cow's fat acid, acrylic acid, methacrylic acid, alkyl esters thereof such as methyl acrylate, ethyl methacrylate, butyl acrylate, 2-hydroxyethyl methacrylate and 2-ethylhexyl acrylate, maleic acid, alkylalkyl esters thereof such as diethyl maleate, dibutyl maleate and dioctyl maleate, and alkyl vinyl ethers such as methylvinyl ether, 2-ethylhexylvinyl ether, laurylvinyl ether, palmitylvinyl ether and stearylvinyl ether. Examples of the comonomer include ethylene, propylene, acrylonitrile, methacrylonitrile, styrene, chlorostyrene, itaconic acid and alkyl esters thereof, crotonic acid and alkyl esters thereof, dichloroethylene, trifluoroethylene, halogenated olefins, cycloolefins such as cyclopentene, aconitates, vinyl benzoate and benzoylvinyl ether.

The vinyl chloride copolymer may be any of block copolymer, graft copolymer, alternating copolymer and random copolymer. As the case may be, the vinyl chloride copolymer may be a copolymer with a compound having peeling function such as a silicone compounds.

Binders other than the essential binder described above may be added to such extent that the object of the present invention is not interfered with.

2. Additives

Peeling agents, antioxidants, UV absorbents, light stabilizers, fillers (inorganic micrograins, organic resin grains) and pigments may be added to the image-receiving layer. Plasticizers, hot solvents and other substances may be added as sensitizers.

The peeling agent improves the detachability between the ink sheet for sublimation thermal transfer described below and the image-receiving layer. Examples of such peeling agents include silicone oil (including silicone resin), solid waxes such as polyethylene wax, amide wax and Teflon powder, and fluorine or phosphate surfactants, with preference given to silicone oil.

Silicone oil is available in two types, namely the simple addition type and the setting or reaction type.

In the case of the simple addition type, it is preferable to use modified silicone oil to improve the compatibility with binder.

Examples of modified silicone oil include polyester-modified silicon resin (or silicon-modified polyester resin), acryl-modified silicon resin (or silicon-modified acrylic resin), urethane-modified silicon resin (or silicon-modified urethane resin), cellulose-modified silicon resin (or silicon-modified cellulose resin), alkyd-modified silicon resin (or silicon-modified alkyd resin) and epoxy-modified silicon resin (or silicon-modified epoxy resin).

Accordingly, polyester-modified silicon resins having polysiloxane resin in their main chain prepared by block copolymerization of polyester, silicon-modified polyester resins having a dimethylpolysiloxane moiety as a side chain bound to the polyester chain, dimethylpolysiloxane-polyester block copolymers, alternating copolymers, graft copolymers and random copolymers can also be used as modified-silicone oil or resin.

In the present invention, it is preferable to add a polyester-modified silicon resin.

Typical examples of polyester-modified silicon resins include copolymers of diol and dibasic acid, polyester-dimethylpolysiloxane block copolymers which are caprolactone ring-opened polymers (including copolymers wherein one or both ends of dimethylsiloxane are blocked by the polyester moiety, and vice versa), and copolymers comprising the polyester as the main chain and (dimethyl)polysiloxane bound thereto as the side chain.

Although the amount of such silicone oil of the simple addition type added cannot be set indiscriminately because it varies depending on the type of silicone oil, it is normally 0.5 to 50% by weight, preferably 1 to 20% by weight of the binder in the image-receiving layer.

Examples of silicone oils of the setting or reaction type include reaction setting silicone oils, photosetting silicone oils and catalytic setting silicone oils.

Examples of reaction setting silicone oils include those prepared by reaction setting of amino-modified silicone oil and epoxy-modified silicon oils.

Examples of catalytic setting or photosetting silicone oils include KS-705F-PS, KS-705F-PS-1 and KS-770-PL-3 (all catalytic setting silicone oils, produced by Shin-Etsu Chemical Co., Ltd.), and KS-720 and KS-774-PL-3 (both photosetting silicone oils, produced by Shin-Etsu Chemical Co., Ltd.).

The amount of these setting silicone oils added is preferably 0.5 to 30% by weight of the binder for the image-receiving layer.

On a part of the surface of the image-receiving layer, a peeling agent layer may be provided by, for example, coating and then drying the peeling agent in solution or dispersion in an appropriate solvent.

Examples of the antioxidant include the antioxidants described in Japanese Patent Publication Open to Public Inspection (hereinafter referred to as Japanese Patent O.P.I. Publication) Nos. 182785/1984, 130735/1985 and 127387/1989 and known compounds which are used to improve the image durability in photographic and other image recording materials.

Examples of the UV absorbent and light stabilizer include the compounds described in Japanese Patent O.P.I. Publication Nos. 158287/1984, 74686/1988, 145089/1988, 196292/1984, 229594/1987, 122596/1988, 283595/1986 and 204788/1989 and known compounds which are used to improve the image durability in photographic and other image recording materials.

Examples of the filler include inorganic micrograins and organic resin grains. These inorganic micrograins include silica gel, calcium carbonate, titanium oxide, acid clay, active clay and alumina. The organic micrograins include grains of resins such as fluorine resin, guanamine resin, acrylic resin and silicon resin. Although varying depending on the specific gravity, the amount of these inorganic or organic resin grains added is preferably 0.1 to 70% by weight.

Typical examples of the pigment include titanium white, calcium carbonate, zinc oxide, barium sulfate, silica, talc, clay, kaolin, active clay and acid clay.

Examples of the plasticizer include phthalates such as dimethyl phthalate, dibutyl phthalate, dioctyl phthalate and didecyl phthalate, trimellitates such as octyl trimellitate, isononyl trimellitaize and isodecyl trimellitate, pyromellitates such as octyl pyromellitate, adipates such as dioctyl adipate, methyllauryl adipate, di-2-ethylhexyl adipate and ethyllauryl adipate, oleates, succinates, maleates, sebacates, citrates, epoxidated soybean oil, epoxidated linseed oil, epoxystearic acid epoxys, phosphates such as triphenyl phosphate and tricresyl phosphate, phosphites such as triphenyl phosphite, Tris-tridecyl phosphite and dibutyl hydrogen phosphite and glycol esters such as ethylphthalylethyl glycolate and butylphthalylbutyl glycolate.

In the present invention, the total amount of additives added normally ranges from 0.1 to 10% by weight of the binder in the image-receiving layer.

Writing Layer

On the face opposite to the image-receiving layer formation face of the support there may be formed a writing layer. When the image-recording member is prepared as an ID card such as a driving license certificate, it is very preferable to provide a writing layer. This is because it is advantageous to form a writing layer in that various pieces of information can be written on the ID card.

The writing layer for the present invention is not described in detail here. For details, refer to the description given under the heading "Writing layer" in Japanese Patent O.P.I. Publication No. 205155/1989, line 14, upper right column, through line 2, lower right column, page 4.

Other Layers

With respect to the image-receiving sheet for thermal transfer recording, the image-receiving layer may be provided with a peeling layer containing a peeling agent (the above-mentioned silicon resin, modified-silicon resin, silicon oil film or hardened silicon oil film) to enhance the preventive effect on the fusion with the ink layer of the ink sheet for thermal transfer recording. The thickness of the peeling layer is normally 0.03 to 2.0 μm.

Also, a cushion layer or barrier layer may be provided between the support and the image-receiving layer. Providing a cushion layer makes it possible to transfer record the image corresponding to the image information with high reproducibility and reduced noise. Examples of materials for the cushion layer include urethan resin, acrylic resin, ethylene resin, butadiene rubber and epoxy resin. The thickness of the cushion layer is normally 1 to 50 μm, preferably 3 to 30 μm.

Providing a barrier layer makes it possible to prevent dye diffusion into the support and prevent dye blurs in the support. Examples of materials for the barrier layer include gelatin, casein and other hydrophilic binders and high-Tg polymers.

2. Preparation of Image-Receiving Sheet for Thermal Transfer Recording

The image-receiving sheet for thermal transfer recording can be produced by the coating method in which the starting components of the image-receiving layer are dispersed or dissolved in a solvent to yield an image-receiving layer coating liquid, which is coated and dried on the surface of the support.

It can also be produced by the lamination method in which a mixture of the image-receiving layer components is melt extruded and laminated on the surface of the support.

Examples of the solvent for the coating method include conventional solvents such as water, alcohol, methyl ethyl ketone, toluene, dioxane and cyclohexanone.

The lamination method can be used in combination with coextrusion.

The image-receiving layer may be formed on the entire surface of the support or on a part of the surface of the support.

The thickness of the image-receiving layer formed on the surface of the support is normally about 2 to 50 μm, preferably about 3 to 20 μm.

When the image-receiving layer itself serves as the support because of its self-supportability and also as the substrate, its thickness is preferably about 60 to 200 μm, preferably about 90 to 150 μm.

3. Ink Sheet for Sublimation Thermal Transfer Recording

The ink sheet for sublimation thermal transfer recording can be configured with the support and an ink layer which contains a sublimation dye and is formed on the support.

Ink Layer Containing a Sublimation Dye

The ink layer containing a sublimation dye essentially contains the sublimation dye; and a binder.

1. Sublimation Dye

Examples of sublimation dyes include cyan dyes, magenta dyes and yellow dyes.

Examples of the cyan dye include the naphthoquinone dyes, anthraquinone dyes and azomethine dyes described in Japanese Patent O.P.I. Publication Nos. 78896/1984, 227948/1984, 24966/1985, 53563/1985, 130735/1985, 131292/1985, 239289/1985, 19396/1986, 22993/1986, 31292/1986, 31467/1986, 35994/1986, 49893/1986, 148269/1986, 191191/1987, 91288/1988, 91287/1988 and 290793/1988.

Examples of the magenta dye include the anthraquinone dyes, azo dyes and azomethine dyes described in Japanese Patent O.P.I. Publication Nos. 78896/1984, 30392/1985, 30394/1985, 253595/1985, 262190/1986, 5992/1988, 205288/1988, 159/1989 and 63194/1989.

Examples of the yellow dye include the methine dyes, azo dyes, quinophthalone dyes and anthraisothiazole dyes described in Japanese Patent O.P.I. Publication Nos. 78896/1984, 27594/1985, 31560/1985, 53656/1985, 12394/1986, and 122594/1988.

The particularly preferable sublimation dyes are azomethine dyes obtained by coupling a compound having an active methylene group of the chain-opened or chain-closed type with the oxidation product of a p-phenylenediamine derivative or p-aminophenol derivative, and indoaniline dyes obtained by coupling with the oxidation product of a phenol, naphthol, p-phenylenediamine or p-aminophenol derivative.

The sublimation dye contained in the ink layer may be any of yellow, magenta and cyan dyes, as long as the image to be formed is monochromic.

For some tones of the image to be formed, two or more of the three kinds of dye and other sublimation dyes may be contained.

The amount of sublimation dye used is normally 0.1 to 20 g, preferably 0.2 to 5 g per $m^2$ of support.

2. Binder

Examples of the binder for the ink layer containing a sublimation dye include cellulose resins such as ethyl cellulose, hydroxyethyl cellulose, ethylhydroxyethyl cellulose, hydroxypropyl cellulose, methyl cellulose, cellulose acetate and cellulose acetobutyrate, vinyl resins such as polyvinyl alcohol, polyvinyl formal, polyvinyl butyral, polyvinyl pyrrolidone, polyester, polyvinyl acetate, polyacrylamide, polyvinyl acetoacetal, styrene resin, styrene copolymer resin, polyacrylates, polyacrylic acid and acrylic acid copolymers, rubber resins, ionomer resins and olefinic resins.

Of these resins are preferred polyvinyl butyral, polyvinyl acetoacetal and cellulose resin, which have excellent acid resistance.

These various binders may be used singly or in combination.

The weight ratio of the binder and the sublimation dye is preferably 1:10 to 10:1, more preferably 2:8 to 8:2.

3. Other Optional Components

Various additives may be added to the ink layer containing a sublimation dye, as long as the object of the invention is not interfered with.

Examples of such additives include peeling compounds such as silicon resin, silicon oil (reaction setting type acceptable), silicon-modified resin, fluorine resin, surfactants and waxes, fillers such as metal micropowder, silica gel, metal oxides, carbon black and resin micropowder, and setting agents capable of reaction with binder components, such as radiation-activated compounds of isocyanates, acrylics and epoxys.

Hot melt substances can also be added to promote transfer, including the waxes, higher fatty acid esters and other hot melt substances described in Japanese Patent O.P.I. Publication No. 106997/1984.

Support

Any material can be used for the support for the ink sheet for sublimation thermal transfer recording, as long as it has good dimensional stability and endures heat during thermal head recording. Examples of such materials include thin papers such as condenser paper and glassine paper, and heat-stable plastic films such as films of polyethylene terephthalate, polyethylene naphthalate, polyamide, polycarbonate, polysulfone, polyvinyl alcohol cellophane and polystyrene.

The thickness of the support is preferably 2 to 10 μm. The support may have a subbing layer for the purpose of improvement its adhesion with binder and preventing dye transfer and migration to the support.

On the back face of the support (opposite to the ink layer containing a sublimation dye), an anti-sticking layer may be provided to prevent the fusion and sticking of the head to the support and wrinkling.

The thickness of the anti-sticking layer is normally 0.1 to 1 μm.

The support is not subject to limitation as to its shape; it may have any shape, including broad sheets and films and narrow tapes and cards.

4. Preparation of Ink Sheet for Sublimation Thermal Transfer Recording

An ink sheet for sublimation thermal transfer recording can be produced by dissolving or dispersing the various starting components of the ink layer containing a sublimation dye in a solvent to yield a coating liquid for the ink layer containing a sublimation dye and coating and drying it on the surface of the support.

The binders are used singly or in combination in solution in a solvent or in dispersion in latex.

Examples of the solvent include water, alcohols such as ethanol and propanol, cellosolves such as methyl cellosolve and ethyl cellosolve, aromatic compounds such as toluene, xylene and chlorobenzene, ketones such as acetone and methyl ethyl ketone, ester solvents such as ethyl acetate and butyl acetate, ethers such as tetrahydrofuran and dioxane and chlorine solvents such as chloroform and trichloroethylene.

The coating process can be achieved by conventional coating methods such as gravure roll sequential coating, extrusion coating, wire bar coating and roll coating.

An ink layer containing a single sublimation dye may be formed on the entire surface of the support or on a part of the surface, or an ink layer containing a binder and a yellow sublimation dye, an ink layer containing a binder and a magenta sublimation dye and an ink layer containing a binder and a cyan sublimation dye may be formed in a given pattern of repeats in the horizontal direction on the entire surface of the support or on a part of the surface.

The thickness of the thus-formed ink layer containing a sublimation dye is normally 0.2 to 10 μm, preferably 0.3 to 3 μm.

In the present invention, convenience can be offered by forming perforations or making detection marks etc. for the detection of the positions of zones with different hues in the ink sheet for sublimation thermal transfer recording.

The ink sheet for sublimation thermal transfer recording should not necessarily comprise a support and an ink layer formed thereon, but may have other layers formed on the surface of the ink layer containing the sublimation dye.

For example, an overcoat layer may be provided to prevent fusion with the image-receiving sheet for thermal transfer recording and sublimation dye locking.

5. Formation of Gradation Image

To form a gradation image, the ink layer containing a sublimation dye of the ink sheet for sublimation thermal transfer recording is superposed on the image-receiving layer of the image-receiving sheet for thermal transfer recording, and heat energy is imagewise given to the ink layer containing the sublimation dye and the image-receiving layer.

The sublimation dye in the ink layer vaporizes or sublimates in the amount corresponding to the heat energy given and migrates to the image-receiving layer, where it is received. As a result, a gradation image is formed on the image-receiving layer.

A thermal head is commonly used as a light source to give heat energy, but other known means such as laser beams, infrared flash light and thermal pens can be used.

When using a thermal head as a heat source to give heat energy, the intensity of heat energy given can be continuously or stepwise changed by altering the voltage or pulse width applied.

When using a laser beam as a heat source to give heat energy, the intensity of heat energy given can be changed by altering the intensity of the laser beam or irradiation area .

In this case, to facilitate the absorption of laser beam, a laser beam absorbent, such as carbon black or infrared absorbent in the case of semiconductor laser, may be contained in or near the ink layer containing the sublimation dye.

When using a laser beam, it is recommended to keep the ink sheet for sublimation thermal transfer recording and the image-receiving sheet for thermal transfer recording in contact with each other.

The use of a dot generator equipped with an acousto-optical element makes it possible to give heat energy in an intensity according to dot size.

6. Character-Information-Bearing Image

This ID card has a character-information-bearing image as well as the gradation image described above on the surface of the image-receiving layer. This character-information-bearing image can be formed using a hot melt ink sheet or an ink sheet for sublimation thermal transfer recording. This character,information-bearing image often shows information specific to the ID card owner.

(1) Character-Information-Bearing Image Based on Hot Melt Ink Sheet

Hot Melt Ink Sheet

The hot melt ink sheet comprises a support and a hot melt ink layer formed thereon. The hot melt ink sheet may have other layers, as long as its properties are not affected. For example, a peeling layer may be provided between the hot melt ink layer and the support, and an interlayer and other layers may be formed between the peeling layer and the support. Also, other layers may be formed on the hot melt ink layer, such as an ink protective layer on the outermost layer. The peeling layer and hot melt ink layer may be prepared to have a multiple-layered structure as necessary.

Next, the configuration of the hot melt ink sheet for the present invention is described in the order of the support, peeling layer and hot melt ink layer.

1. Support

The support for the hot melt ink sheet desirably has good heat resistance and high dimensional stability.

Examples of materials for the support include the films and sheets described in Japanese Patent O.P.I. Publication No. 193886/1988, lines 12 through 18, lower left column, page 2.

The thickness of the support is normally not more than 30 μm, preferably in the range from 2 to 30 μm. If the thickness of the support exceeds 30 μm, thermal conductivity deterioration can result in printing quality degradation.

The hot melt ink sheet is not subject to limitation as to the configuration of the back face of the support; for example, a backing layer, such as an anti-sticking layer, may be provided.

2. Hot Melt Ink Layer

The hot melt ink layer comprises a hot melt compound, a thermoplastic resin, a colorant and other components.

Any hot melt compound can be used optionally, as long as it is commonly used in the hot melt ink layer for this kind of hot melt ink sheets. Examples of such hot melt compounds include low molecular thermoplastic resins such as polystyrene resin, acrylic resin, styrene-acrylic resin, polyester resin and polyurethane resin and the substances exemplified in Japanese Patent O.P.I. Publication No. 193886/1988, line 8, upper left column through line 12, upper right column, page 4, and rosin and rosin derivatives such as hydrogenated rosin, polymerized rosin, rosin-modified glycerol, rosin-modified maleic resin, rosin-modified polyester resin, rosin-modified phenol resin and ester rubber, and phenol resin, terpene resin, ketone resin, cyclopentadiene resin and aromatic hydrocarbon resin.

These hot melt compounds preferably have a molecular weight of not more than 10,000, more preferably not more than 5,000 and a melting point or softening point of 50° to 150° C.

These hot melt compounds may be used singly or in combination.

Various thermoplastic resins can be used in the hot melt ink layer, including those which are commonly used in the hot melt ink layer of this kind of hot melt ink sheets, such as the substances exemplified in Japanese Patent O.P.I. Publication No. 193886/1988, upper right column, page 4 through line 18, upper left column, page 5.

Any colorant can be used in the hot melt ink layer with no limitation, as long as it is commonly used in the hot melt ink layer of this kind of hot melt ink sheets. Examples of such colorants include the organic and inorganic pigments and organic dyes described in Japanese Patent O.P.I. Publication No. 193886/1988, lines 3 through 15, upper right column, page 5.

These colorants may be used singly or in combination as necessary.

To the hot melt ink layer, there may be added other additives, as long as the object of the present invention is not interfered with.

For example, the hot melt ink layer may contain a fluorine surfactant. The presence of a fluorine surfactant prevents the blocking phenomenon in the ink layer.

Also, it is effective to add organic micrograins, inorganic micrograins or incompatible resin to improve the sharpness of the transferred character information image, i.e., the sharpness in the character borders.

The thickness of the hot melt ink layer is normally 0.6 to 5.0 μm, preferably 1.0 to 4.0 μm.

Although the hot melt ink layer may be formed by the organic solvent method, in which the components are coated in dispersion or solution in organic son,vent, or by the hot melt coating method, in which a thermoplastic resin etc. are coated in a thermally softened or molten state, it is preferable to prepare it by coating an emulsion or solution of the components in water or organic solvent.

The total content of the layer-forming components in the coating liquid for the hot melt ink layer is set normally in the range from 5 to 50% by weight.

Coating can be achieved by ordinary methods, including wire bar coating, squeeze coating and gravure coating.

Although at least one hot melt ink layer is necessary, two or more hot melt ink layers with different types and contents of colorants, or different ratios of thermoplastic resin and hot melt compound may be formed.

3. Peeling Layer

The major purpose of forming the peeling layer is to ensure satisfactorily rapid detaching arid transfer of at least the layers formed on the peeling layer (at least one of these layers contains a colorant) upon heating by a heating mechanism for image transfer such as a thermal head during image formation. A hot melt compound suitable for this purpose is added to prepare a layer wherein the nature of the hot melt compound, specifically the excellent peeling property dominates.

Although the peeling layer may comprise the hot melt compound alone, it preferably comprises the hot melt compound and/or a binder resin such as a thermoplastic resin.

The hot melt compound used as the major component of the peeling layer is any known one, including the substances exemplified in Japanese Patent O.P.I. Publication No. 193886/1988, lines 8, upper left column through line 12, upper right column, page 4.

The hot melt compound used as the major component of the peeling layer of the hot melt ink sheet is preferably a microcrystalline wax, paraffin wax or carnauba wax having a melting point or softening point of 50° to 100° C. among the hot melt compounds exemplified above. Too high melting points or softening points can hamper the obtainment of the desired sufficient detachability, particularly in high speed printing. Too low melting points or softening points can cause a failure of peeling under ordinary conditions.

These hot melt compounds may be use:d singly or in combination.

The binder resin in the peeling layer or the thermoplastic resin used as a component thereof is not subject to limitation; any known resin can be used, as long as it is used in the peeling layer of this kind of ink sheets for hot melt thermal transfer recording.

Examples of the thermoplastic resin include ethylenic copolymers such as ethylene-vinyl acetate resin, polyamide resin, polyester resin, polyurethane resin, polyolefin resin, acrylic resin and cellulose resin. As the case may be, also usable are resins such as vinyl chloride resin, rosin resin, petroleum resin and ionomer resin, elastomers such as natural rubber, styrene-butadiene rubber, isoprene rubber and chloroprene rubber, rosin derivatives such as ester rubber, rosin-modified maleic acid resin, rosin-modified phenol resin and hydrogenated rosin, phenol resin, terpenone resin, cyclopentadiene resin and aromatic resins.

Of these substances, ethylenic copolymers such as ethylene-vinyl acetate copolymer or ethylene-vinyl acetate based copolymer, and cellulose resin are preferable, with more preference given to ethylene-vinyl acetate copolymer and cellulose resin.

These thermoplastic resins may be used singly or in combination.

In the present invention, the thermoplastic resin selected from the various thermoplastic resins exemplified above to use as a component of the peeling layer preferably has a melting point or softening point of 50° to 150° C., more preferably 60° to 120° C., or may be a mixture thereof whose melting point or softening point falls in this range.

The peeling layer may contain a colorant as necessary.

When the peeling layer contains a colorant, its content is normally not more than 30% by weight, preferably not more than 20% by weight of the total components of the peeling layer.

Ordinary colorants can be used for this purpose; the same colorants as those exemplified in the paragraph "2. Hot melt ink layer" can be used.

The peeling layer may further contain other components as necessary, as long as the object of the present invention is not interfered with. Examples of such other components include higher fatty acids, higher alcohols, higher fatty acid esters, amides and higher amines. These substances may be used singly or in combination.

The thickness of the peeling layer normally ranges from 0.2 to 4 μm, preferably from 0.5 to 2.5 μm.

In addition to the components described above, the peeling layer may contain a surfactant for adjusting the detachability. Typical examples of surfactants used for the present invention include compounds with a polyoxyethylene chain. Inorganic or organic micrograins such as metal powder and silica gel and oils such as linseed oil and mineral oil may also be added.

The peeling layer serves mainly to adjust adhesion between the hot melt ink layer formed thereon and the support, facilitating the peeling of these layers from the support by heating from the back face (opposite to the side where the peeling layer and other layers are formed) of the support using a thermal head, four instance.

In other words, the peeling layer makes the hot melt ink layer to be rapidly peeled and transferred onto the substrate upon release of the hot melt ink layer from the support immediately after heating, while maintaining film adhesion to the support, film strength and other mechanical properties of the hot melt ink layer. Formation of character-information-bearing image The present hot melt transfer method using a hot melt ink sheet, not different from the ordinary thermal transfer recording method, is described below for the case where a thermal head, the most typical source of heat, is used.

First, the hot melt ink layer of the hot melt ink sheet and the image-receiving surface of the substrate are placed in close contact with each other, and while providing thermal pulse by means of a thermal head from the back of the substrate using a platen as necessary, the hot melt ink layer corresponding to the desired printing or transfer pattern is heated locally.

The heated portion of the hot melt ink layer becomes hot and quickly softens and is transferred onto the image-receiving surface of the substrate.

This character-information-bearing image may be formed before formation of the gradation-information-bearing image, and vice versa.

(2) Character-Image-Bearing Image Based on Ink Sheet for Sublimation Thermal Transfer Recording The ink sheet for sublimation thermal transfer recording used in this case is not described in detail here, since its description is the same as in "3. Ink sheet for sublimation thermal transfer recording" described above.

The method of forming a character-image-bearing image using an ink sheet for sublimation thermal transfer recording is not described in detail here, since it is the same as in "5. Formation of gradation image".

7. Transparent Resin Layer

As stated above, this transparent resin layer is formed on the surface of an image-receiving layer having a gradation image and a character-information-bearing image. If the ID card is a personal identification certificate issued by an organization, information shared by a group of ID cards of the same kind, such as the name of the card issuer organization or various pieces of common information on the card issuer organization, has been formed as common character information on the surface of this transparent resin layer facing the image-receiving layer. This common character information may be figures or symbols as well as characters.

The transparent resin layer can be formed on the surface of the image-receiving layer by hot stamping a transparent resin sheet having common character information.

Transparent Resin Sheet

This transparent resin sheet can serve for the purpose, as long as it has a minimum size allowing the coverage of the surface of the image-receiving layer with a gradation image formed thereon and the surface region of the image-receiving layer allowing formation of a common character-information-bearing image. Therefore, the size of the transparent resin sheet formed of the surface of the image-receiving layer may be equal to, or smaller than, that of the surface of the image-receiving layer (opposite to the support face). When the size of the transparent resin sheet is equal to that of the surface of the image-receiving layer, the transparent resin layer formed by the transparent resin sheet on the surface of the image-receiving layer can serve as an image protective layer. When the size of the transparent resin sheet is sufficient to cover the gradation image and common character information image, it is recommended to form a UV-setting resin layer, for instance, as a protective layer on the entire image-receiving layer to protect the other character-information-bearing image exposed on the surface of the image-receiving layer. The UV-setting resin layer is described later.

Examples of materials which can be preferably used for the support for the transparent resin sheet include polyolefin films exemplified by transparent polyethylene films and transparent polypropylene films with 3.0 to 30 μm thickness, and polyhalogenated olefin films exemplified by transparent polyvinyl chloride films, transparent polyethylene terephthalate films, polycarbonate films and polystyrene films. This transparent resin sheet can also be formed with the hot melt compound described in Japanese Patent O.P.I. Publication No. 183881/1988, line 9, lower left column, page 9 through line 15, upper left column, page 10 and the thermoplastic resin exemplified in the same publication, line 16, upper left column, page 10 through line 9, lower left column, page 11.

It is also preferable to add a UV absorbent to the transparent resin sheet when forming a UV-setting resin layer. A transparent resin sheet containing a UV absorbent is effective in protecting the gradation image from ultraviolet rays when a coating agent containing a UV-setting prepolymer is irradiated with ultraviolet rays.

Examples of UV absorbents include the compounds exemplified in the description of the image-receiving layer.

Varying depending on the type of compound, the contents of these substances in the transparent resin layer can be determined experimentally for each compound.

The thickness of the transparent protective layer is normally 0.5 to 20.0 μm, preferably 1.0 to 10.0 μm. If the thickness of the transparent resin sheet is less than 0.5 μm, it is so thin that the protective layer function can be degraded; if it exceeds 20.0 μm, it becomes difficult to transfer the desired shape during hot stamping and residence of the transparent resin layer not to be transferred (so-called burr) can occur, which is undesirable.

The transparent resin layer is usually formed on the support either directly or via a peeling layer. On the surface of this transparent resin sheet, i.e., the surface on which a transparent resin sheet is formed by hot stamping as described later, a common character information image is formed.

This common character information image can be formed by known methods such as hot melt thermal transfer using a hot melt ink sheet, sublimation thermal transfer recording using an ink sheet for sublimation thermal transfer recording and ordinary printing methods. The region in which the common character information image is formed on the transparent resin sheet is prepared so that it is out of the region of gradation image formation when the transparent resin sheet is adhered to the surface of the image-receiving layer.

Formation of Transparent Resin Layer

The transparent resin layer can be formed by laminating the transparent resin sheet on the surface of the image-receiving layer by hot stamping.

Hot stamping is a method in which a transparent resin sheet is adhered onto the surface of the image-receiving layer by heating and pressurizing the transparent resin sheet in contact with the surface of the image-receiving layer. In this case, although heating temperature varies depending on the materials and other factors of the transparent resin sheet and image-receiving layer, it is usually selected in the range from 100° to 250° C. preferably 120°–250° C. Pressure cannot be specified, since it varies according to the materials and other factors of the transparent resin sheet and image-receiving layer, it is usually selected in the range from 5 to 1500 kg/cm$^2$, preferably 5 to 100 kg/cm$^2$. Heating or pressurizing is its method. Examples of usable heating means include heat rollers and heating plates. Examples of pressurizing means include pressure rollers and pressure plates.

8. UV-Setting Resin Layer

In the ID card of the present invention, a substantially transparent setting protective layer set by UV irradiation may be formed on the entire surface of the image-receiving layer having a transparent resin layer.

The UV-setting resin layer can be formed by coating a coating agent containing a UV-setting re, sin on the substrate and irradiating it with ultraviolet rays.

Coating Agent

The coating agent can be formed with a composition whose major components are a UV-setting prepolymer and a polymerization initiator.

The UV-setting prepolymer includes prepolymers having two or more epoxy groups in their molecular structure. Examples of such prepolymers include alcyclic polyepoxides, polybasic acid polyglycidyl esters, polyhydric alcohol polyglycidyl ethers, polyoxyalkylene glycol polyglycidyl ethers, aromatic polyol polyglycidyl ethers, hydrogen adducts of aromatic polyol polyglycidyl ethers, urethane polyepoxy compounds and epoxidated polybutadienes. These prepolymers may be used singly or in combination.

The content of prepolymers having two or more epoxy groups in their molecular structure in the coating agent is preferably not less than 70% by weight.

The polymerization initiator is preferably a cationic polymerization initiator, specifically an aromatic onium salt .

Examples of such aromatic onium salts include phosphonium salts and other salts of elements in Group Va in the periodic table of elements, such as triphenylphenacylphosphonium hexafluorophosphate, sulfonium salts and other salts of elements in Group VIa, such as triphenylsulfonium tetrafluoroborate, triphenylsulfonium hexafluorophosphate, Tris(4-thiomethoxyphenyl)sulfonium hexafluoropnosphate and triphenylsulfonium hexafluoroantimonate and iodonium salts and other salts of elements in Group VIIa, such as diphenyliodonium chloride.

How to use these aromatic onium salts as cationic polymerization initiators for polymerization of epoxy compounds is described in detail in U.S. Pat. Nos. 4,058,401, 4,069,055, 4,101,513 and 4,161,478.

Preferable cat ionic polymerization initiators are sulfonium salts of elements in Group VIa, with more preference given to triarylsulfonium hexafluoroantimonate from the viewpoint of UV settability and UV-setting composition storage stability.

The cationic polymerization initiator content in the coating agent is preferably 3 to 20% by weight, more preferably 5 to 12% by weight. Cationic polymerization initiator contents lower than 1% by weight of the coating agent are undesirable because they can extremely retard setting upon UV irradiation.

In addition to the above-mentioned epoxy setting resins, radical polymerizable resins such as monofunctional or polyfunctional acrylate compounds are included in UV-setting resins.

The coating agent may contain surfactants such as oils, especially silicone oil, and silicone-alkylene oxide copolymers (e.g., L-5410, commercially supplied by Union Carbide), aliphatic epoxides containing silicone oil, and fluorocarbon surfactants such as FO-171 and FO-430, both commercially supplied by 3M Company, and Megafac F-141, commercially supplied by Dainippon Ink and Chemicals Inc..

The coating agent may further contain vinyl monomers such as styrene, p-methylstyrene, methacrylates and acrylates, celluloses, and monoepoxides such as thermoplastic polyester, phenylglycidyl ether, silicon-containing monoepoxide and butylglycidyl ether, as long as the effect of the present invention is not interfered with.

The coating agent may contain inert components, including fillers such as talc, calcium carbonate, alumina, silica, mica, barium sulfate, magnesium carbonate and glass, dyes, pigments, thickening agents, plasticizers, stabilizers, leveling agents, coupling agents, tackifiers, wettability improvers such as surfactants containing a silicone group or fluorocarbon group, and other various additives. The coating agent may also contain small amounts of solvents flowing almost no reaction with the cat ionic polymerization initiator, such as acetone, methyl ethyl ketone and methyl chloride, for the purpose of improving the fluidity of the coating agent during its coating.

Method and Conditions of Coating

Coating of the coating agent on the surface of the image-receiving layer can be achieved by coating the coating agent, as such or after being adjusted to appropriate viscosity by the addition of solvent etc. where necessary, on the surface of the image-receiving layer by an ordinary coating means such as a double roll coater, slit coater, air knife coater, wire bar coater, slide hopper or spray coater.

By one of these coating methods, a coating layer with the coating agent is coated on the surface of the image-receiving layer to a thickness of normally 0.1 to 30 $\mu$m, preferably 1 to 14 $\mu$m.

After coating, the coating layer with the coating agent is irradiated with ultraviolet rays, whereby polymerization or setting reaction of the UV-setting prepolymer in the coating agent proceeds.

Here, "ultraviolet (UV)" means light having a spectrum in the UV band, including light beams involving light in the UV band. Consequently, UV irradiation includes solar ray irradiation, low voltage mercury lamp irradiation, high voltage mercury lamp irradiation, ultrahigh voltage mercury lamp irradiation, carbon arc irradiation, metal halide lamp irradiation and xenon lamp irradiation.

UV irradiation is preferably conducted in an inert gas atmosphere such as air, nitrogen gas or carbon dioxide gas.

Although UV irradiation time varies depending on the type of light source for irradiation in the UV band, it is normally 0.5 second to 5 minutes, preferably 3 seconds to 2 minutes. When the irradiation time is short, a large light sources with high irradiation intensity is required; when the irradiation time is long, a light source with low irradiation intensity can be used, though the use of a light source with low irradiation intensity requires long setting action time, which is unadvantageous from the viewpoint of process efficiency. In the present invention, however, a set film with practically satisfactory strength can be formed by 3 seconds to 2 minutes of irradiation using a UV lamp with 200 W or lower output.

Setting time can be shortened by heating the film of the coating agent at, before or after UV irradiation. When such heating is conducted, heating temperature is preferably 30° to 80° C. Before UV irradiation, heating at the heating temperature may be long or short, but after UV irradiation, heating time is preferably 1 to 120 minutes.

PREFERRED EMBODIMENTS

Examples 1 and 2, Comparative Examples 1 and 2

A card-sized image-receiving sheet for thermal transfer recording was produced as follows.

A broad white vinyl chloride sheet having a thickness of 450 μm. obtained by hot melting a 150 μm thick hard transparent vinyl chloride sheet on both faces of a 750 μm thick hard white vinyl chloride sheet, was cut to yield an image-receiving sheet substrate having a card size of 54.0 mm×85.5 mm.

An image-receiving layer coating liquid and an adhesive layer coating liquid, having the following compositions, respectively, were coated on the image-receiving sheet substrate by the wire bar method, and the solvent was evaporated off, to form a 3 μm thick adhesive layer and a 7 μm thick image-receiving layer on the image-receiving sheet substrate in this order.

| | |
|---|---|
| Image-receiving layer coating liquid | |
| Polyvinyl chloride resin (S-MEDICA V 5142E, produced by Sekisui Chemical Co., Ltd.) | 6.0 parts |
| Vinyl chloride-maleic acid mono-2-ethylhexyl copolymer (vinyl chloride content 85.1%, Tg 75° C., degree of polymerization 500) | 3.5 parts |
| Polyester-modified silicone resin (X-24-8300, produced by Shin-Etsu Silicone) | 0.5 parts |
| Methyl ethyl ketone | 80 parts |
| Cyclohexanone | 10 parts |
| Adhesive layer coating liquid | |
| Vinyl chloride resin Vinylite VYHH (produced by Union Carbide) | 10 parts |
| Methyl ethyl ketone | 90 parts |

Next, on the support's face opposite to the image-receiving layer, a writing layer coating liquid having the following composition was coated by reverse coating using a partially etched gravure roll, and was dried, to yield a 3.5 μm thick writing layer.

| Composition of writing layer coating liquid | |
|---|---|
| Saturated polyester resin (Vylon 200, produced by Toyobo Co., Ltd.) | 90 parts by weight |
| Calcium carbonate (Brilliant 15, produced by Shiraishi Calcium) | 25 parts by weight |
| Toluene/methyl ethyl ketone (weight ratio 1:1) | 400 parts by weight |

-continued

Preparation of Ink Sheet for Thermal Transfer Recording

The following starting compositions; were mixed to yield an ink layer coating liquid containing a heat diffusible dye.

| | |
|---|---|
| Ink layer coating liquid (yellow) | |
| MS Yellow (produced by Mitsui Toatsu Chemicals Inc.) | 3.0 parts |
| Polyvinyl butyral (S-LEC BX-1, produced by Sekisui Chemical Co., Ltd.) | 3.0 parts |
| Methyl ethyl ketone | 44 parts |
| Dioxane | 40 parts |
| Cyclohexanone | 10 parts |
| Ink layer coating liquid (magenta) | |
| MS Magenta (produced by Mitsui Toatsu Chemicals Inc.) | 3.0 parts |
| Polyvinyl butyral (S-LEC BX-1, produced by Sekisui Chemical Co., Ltd.) | 3.0 parts |
| Methyl ethyl ketone | 44 parts |
| Dioxane | 40 parts |
| Cyclohexanone | 10 parts |
| Ink layer coating liquid (cyan) | |
| Kayaset Blue 136 (produced by Nippon Kayaku Co., Ltd.) | 3.0 parts |
| Polyvinyl butyral (S-LEC BX-1, produced by Sekisui Chemical Co., Ltd.) | 3.0 parts |
| Methyl ethyl ketone | 44 parts |
| Dioxane | 40 parts |
| Cyclohexanone | 10 parts |

On the corona-treated surface of a 6 μm thick polyethylene terephthalate film (produced by Toray Industries, Inc.), the ink layer coating liquid described above was coated and dried at horizontal intervals using a wire bar to a dry thickness of 1 μm to form layers containing a yellow, magenta and cyan dye, respectively. On the back face, not subjected to the corona treatment, one or two drops of a nitrocellulose solution containing 40% silicone resin (SP-2105, produced by Dainichiseika Color & Chemicals Manufacturing Co., Ltd.) were dropped using a syringe and spread over the entire surface for a back face coating treatment to have a dry film thickness of 0.2 μm to yield an ink sheet for thermal transfer recording.

A sheet having a hot melt ink layer was produced as follows. Specifically, on one face of a 4.5 μm thick polyethylene terephthalate sheet, a hot melt ink layer coating liquid was coated by the wire bar coating method and was dried to yield a hot melt ink layer having a dry thickness of 1.5 μm. On the back face of the polyethylene terephthalate sheet, opposite to the hot melt ink layer, one or two drops of a nitrocellulose solution containing 40% silicone resin (SP-2105, produced by Dainichiseika Color & Chemicals manufacturing Co., Ltd.) were dropped using a syringe and spread over the entire surface to yield an anti-sticking layer having a dry thickness of 0.2 μm.

| Composition of hot melt ink layer coating liquid | |
|---|---|
| Carnauba wax | 1 part |
| Ethylene-vinyl acetate copolymer (EV-40Y, produced | 1 part |

-continued

| Composition of hot melt ink layer coating liquid | |
|---|---|
| by Du-Pont Mitsui Chemical Co., Ltd.) | |
| Carbon black | 6 parts |
| Phenol resin (Tamanol 521, produced by Arakawa Chemical Industry Ltd.) | 12 parts |
| Methyl ethyl ketone | 80 parts |

An image-recording member (ID card) was produced as follows. The image-receiving layer of the image-receiving sheet for thermal transfer recording described above and the sublimation dye layer of the ink sheet for sublimation thermal transfer recording were superposed and heated from the sublimation thermal transfer recording ink sheet side under conditions of 0.23 W/dot output, 0.3 to 4.5 msec pulse width and 16 dots/mm dot density using a thermal head to form a personal portrait image with gradation.

Next, the hot melt ink layer was superposed thereon and heated under conditions of 0.5 W/dot output, 1.0 msec pulse width and 16 dots/mm dot density using a thermal head to transfer the character information to a region other than the personal portrait image region.

Hot stamping sheet for transparent resin layer transfer

After a 0.6 μm thick layer of UV-setting resin (phosphazene resin Idemitsu PPZ U2000, produced by Idemitsu Petrochemical Co., Ltd.) was coated on the corona-discharged face of a 6 μm thick transparent polyethylene terephthalate film (produced by Dia Foil K.K.), ultraviolet rays were irradiated to form a set transfer property improving layer, followed by coating a transparent resin layer coating liquid having the following composition to yield a transparent resin transfer layer with an overall thickness of 100 μm and common character information recorded thereon.

On the opposite face of this polyethylene terephthalate sheet, an anti-sticking layer coating liquid having the following composition was coated to yield an anti-sticking layer.

The resulting hot stamping sheet for transparent resin layer transfer was subjected to hot stamping using the hot stamping machine MP-6X model, produced by Navitas K.K., so that it covered the personal photographic image and hot melt thermal transfer character image on the card to yield a transparent resin layer.

| | |
|---|---|
| Composition of transparent protective layer coating liquid | |
| Polyester resin (Vylon 200, produced by Toyobo Co., Ltd.) | 7.5 parts |
| UV absorbent 2,4-dihydroxybenzophenone | 2.5 parts |
| Methyl ethyl ketone (solvent) | 90 parts |
| Anti-sticking layer coating liquid | |
| Nitrocellulose | 3 parts |
| Acryl silicon resin | 7 parts |
| Methyl ethyl ketone | 90 parts |

The image recording member (ID card) thus obtained was named sample 1.

Another sample 2 was prepared in the same manner as with sample 1 except that the transparent protective layer was prepared to have the following two-layer structure (upper layer thickness 2.0 μm, lower layer thickness 2.0 μm) and the UV absorbent was replaced with hydroxybenzophenone.

Transparent Protective Layer

| | |
|---|---|
| Composition of upper layer coating liquid | |
| Polyparabanic acid (XT-4, produced by Tonen Sekiyu kagaku K.K.) | 9.5 parts |
| Silicon resin powder (Tospearl 108, produced by Toshiba Silicone Co., Ltd.) | 0.5 part |
| 1,4-dioxane | 90 parts |
| Composition of lower layer coating liquid | |
| Polyester resin (Vylon 200, produced by Toyobo Co., Ltd.) | 6.5 parts |
| UV absorbent 2,4-dihydroxybenzophenone | 3.5 parts |
| Methyl ethyl ketone (solvent) | 90 parts |

For comparison, comparative samples 1 and 2 were prepared in the same manner as sample 1 except that no transparent resin layer was formed on the image-formed surface of the image-receiving layer for comparative sample 1 and a commercially available pouch film (produced by Nippon GBC, 100 μm) was hot melt adhered to comparative sample 1 at 140° C. using a simple laminator (LPC170, produced by Fuji Plastic Kikai K.K.) for comparative sample 2.

These four kind samples were assessed as to the following items. The results are shown in Table 1.

Evaluation

Appearance:

The samples were assessed with respect to aesthetic appearance for commercial value.

Prevention of forgery and alteration:

1) The surface protective layer on the image-receiving layer was peeled at 80° C. and observed for the peeling state.

2) Falsifiability of data written on the image-receiving layer

Durability:

After rubbing the sample surface with a methanol-soaked cotton swab, the surface condition was visually observed.

TABLE 1

| | Appearance | Prevention of forgery and alteration | Durability |
|---|---|---|---|
| Sample 1 | Beautiful | 1) Substrate destroyed<br>2) Impossible | No change |
| Sample 2 | Beautiful | 1) Substrate destroyed<br>2) Impossible | No change |
| Comparative sample 1 | Beautiful | 1) —<br>2) Easy | Image dissolution, blurs |
| Comparative sample 2 | Curling occurred on the card after lamination. | 1) Easily detachable from the adhesion interface<br>2) Easy | No change |

As is evident from these results, the comparative samples all had a critical fault for ID cards while the inventive sample 1 offered an ID card excellent in appearance, prevention of forgery and alteration and durability.

According to the method of producing an ID card of the present invention, working efficiency can be significantly increased in issuing a large number of ID cards of the same kind because characters, figures and other information shared by the same kind of ID cards are formed on the image-receiving layer by hot stamping after thermal transfer of a portrait images as an gradation image and a character-information-bearing image on the support. The ID cards produced by this method offer excellent gradation image preservability and prevents forgery and alteration of the gradation image because they are covered in the region having the gradation image in the image-receiving layer.

What is claimed is:

1. A method for the production of an ID card comprising (a) forming an image-receiving layer on a support,
(b) forming a gradation image with a heat diffusible dye on said image-receiving layer,
(c) forming a character information bearing image with said heat diffusible dye or a hot melt ink on said image-receiving layer where said gradation image is absent,
(d) preprinting a transparent sheet with a preprinted image common to a plurality of the ID cards to be produced,
(e) applying said transparent sheet to said image receiving layer, and
(f) hot stamping an entire surface of said transparent sheet.

2. A method for the production of ID cards comprising a. forming an image-receiving layer on a base support,
b. forming a gradation image on said image-receiving layer by means of a heat diffusible dye,
c. forming a character information bearing image with said diffusible dye or a hot melt ink on said image-receiving layer where said gradation image is absent,
d. providing a backing sheet comprising a transparent resin layer having a layer thickness of 0.5 to 20 $\mu m$ on a sheet support,
e. preprinting said transparent resin layer with a data image containing information common to a plurality of said ID cards,
f. transferring said resin layer after said preprinting from said sheet support onto at least a portion of a surface of said image-receiving layer by heating.

3. The method of claim 2 wherein said backing sheet covers a complete surface of said ID card.

4. The method of claim 2 wherein said base support is of PET.

5. The method of claim 2 wherein said hot stamping is carried out at 120° to 250° C. and under a pressure of 5 to 100 kg/cm$^2$.

6. The method of claim 5 wherein said backing sheet is 1 to 20 $\mu m$ thick.

7. The method of claim 6, wherein said backing sheet is 2 to 10 $\mu m$ thick.

8. The method of claim 2 wherein said thickness is 1.0 to 10 $\mu m$.

9. The method of claim 2 wherein a peeling layer is provided between said sheet support and said resin layer.

10. The method of claim 10 wherein said base support has a base thickness of 200 to 1000 $\mu m$.

11. The method of claim 10 wherein said base thickness is 300 to 800 $\mu m$.

12. The method of claim 10 wherein said base thickness is 300 to 800 $\mu m$.

13. The method of claim 2 wherein said sheet support is transparent.

14. A method for the production of ID cards comprising a. forming an image-receiving layer on a PET based support, said support having a thickness of 300 to 800 $\mu m$,
b. forming a gradation image on said image-receiving layer by means of a heat diffusible dye,
c. forming a character information bearing image with said diffusible dye or a hot melt ink on said image-receiving layer where said gradation image is absent,
d. providing a backing sheet comprising a transparent resin layer having a layer thickness of 0.5 to 20 $\mu m$ on a sheet support,
e. preprinting said transparent resin layer with a data image containing information common to a plurality of said ID cards,
f. transferring said transparent resin layer, after said preprinting, from said sheet support onto at least a portion of a surface of said image-receiving layer by hot stamping at 120° to 250° C.

15. The method of claim 14 wherein said support comprises PET sandwiched between layers of polypropylene.

16. The method of claim 14 wherein said sheet support is transparent.

* * * * *